(12) United States Patent
Yokoyama

(10) Patent No.: US 9,651,778 B2
(45) Date of Patent: May 16, 2017

(54) LIGHT FLUX DIAMETER ENLARGING ELEMENT AND DISPLAY DEVICE

(71) Applicant: Seiko Epson Corporation, Tokyo (JP)

(72) Inventor: Osamu Yokoyama, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/058,178

(22) Filed: Mar. 2, 2016

(65) Prior Publication Data

US 2016/0282615 A1    Sep. 29, 2016

(30) Foreign Application Priority Data

Mar. 23, 2015   (JP) ................. 2015-059173

(51) Int. Cl.

| G02B 27/00 | (2006.01) |
| G02B 27/42 | (2006.01) |
| G02B 5/18 | (2006.01) |
| H04N 9/14 | (2006.01) |
| H04N 9/31 | (2006.01) |
| G02B 27/01 | (2006.01) |

(52) U.S. Cl.
CPC ....... *G02B 27/0081* (2013.01); *G02B 5/1861* (2013.01); *G02B 5/1866* (2013.01); *G02B 27/0172* (2013.01); *G02B 27/4227* (2013.01); *G02B 27/4272* (2013.01); *H04N 9/14* (2013.01); *H04N 9/31* (2013.01); *G02B 2027/0125* (2013.01); *G02B 2027/0178* (2013.01)

(58) Field of Classification Search
CPC ............ G02B 27/0081; G02B 27/4272; G02B 27/4227; G02B 5/1866; G02B 5/1861; G02B 2027/0125; G02B 2027/0178; G02B 27/0172; H04N 9/14; H04N 9/31
See application file for complete search history.

(56) References Cited

U.S. PATENT DOCUMENTS 5,742,262 A    4/1998 Tabata et al.
5,805,759 A *  9/1998 Fukushima .......... G02B 6/2713
                                                       359/889

(Continued)

FOREIGN PATENT DOCUMENTS

JP    07-072422 A    3/1995
JP    2010-085785 A  4/2010

*Primary Examiner* — Michael Teitelbaum
(74) *Attorney, Agent, or Firm* — ALG Intellectual Property, LLC

(57) ABSTRACT

A light flux diameter expanding element (a pupil expanding element) used in a retina scanning display device includes first to fourth diffraction gratings which are provided with grating patterns extending in a first direction, and fifth to eighth diffraction gratings which are provided with grating patterns extending in a second direction, and includes a half-wave plate between the first diffraction grating and the fifth diffraction grating. A first light flux of polarized light in which an electric field vector oscillates in the first direction enters the first diffraction grating. A second light flux of polarized light in which the electric field vector oscillates in the second direction enters the fifth diffraction grating due to the half-wave plate. Therefore, it is possible to expand a diameter of the incident first light flux in the first direction and the second direction and emit the result as the third light flux.

12 Claims, 8 Drawing Sheets

(56) References Cited

U.S. PATENT DOCUMENTS

2003/0161043 A1*  8/2003  Hoshi .................. G02B 5/1866
                                                          359/566
2009/0190222 A1   7/2009  Simmonds et al.
2016/0139407 A1   5/2016  Yokoyama et al.

* cited by examiner

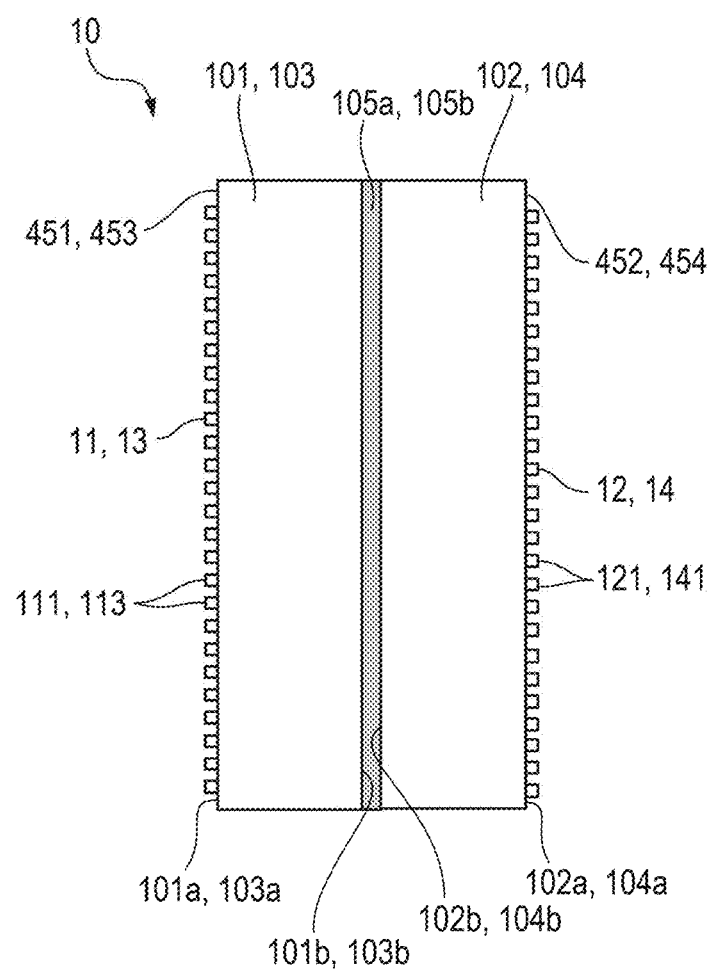

LIGHT FLUX DIAMETER ENLARGING ELEMENT AND DISPLAY DEVICE

BACKGROUND

1. Technical Field

The present disclosure relates to a display device which causes an optically modulated light flux, and a light flux diameter expanding element which expands a light flux diameter.

2. Related Art

A retina scanning display device which causes an optically modulated light flux to enter the eye of the user is provided with a light source unit, a scanning optical system, and a light guide system. The light source unit emits a light flux for displaying an image, the scanning optical system scans the light flux which is emitted from the light source unit, and the light guide system reflects the light flux which is scanned by the scanning optical system to cause the light flux to enter the eye of the user. In the retina scanning display device, when the light flux is small, since the light flux does not enter the pupil when the position of the pupil changes, cases occur in which the image is missing or the like. Therefore, the retina scanning display device is provided with a light flux diameter expanding element (a pupil expanding element).

Meanwhile, a light flux diameter expanding element (a pupil expanding element) is proposed in which two diffraction gratings (a first diffraction grating and a second diffraction grating) face each other, and the diffraction angles thereof are matched by rendering the grating periods of both of the diffraction gratings the same (JP-A-7-72422).

However, since the polarization of the light flux is not considered in the light flux diameter expanding element described in JP-A-7-72422, there is a problem in that when the grating period is small, the light flux diameter may not be suitably expanded. In other words, in a diffraction grating in which concave portions or convex portions which extend linearly are arranged periodically, although incident polarization dependence of the diffraction efficiency increases and the diffraction efficiency increases in relation to polarized light (a Transverse Electric Wave (a TE wave)) in which the electric field vector oscillates in the direction in which the concave portions or the convex portions extend, the diffraction efficiency decreases in relation to polarized light (a Transverse Magnetic Wave (a TM wave)) in which the electric field vector oscillates in a direction perpendicular to the direction in which the concave portions or the convex portions extend. Therefore, when the light flux which is incident on the diffraction grating is a TM wave, the effect of expanding the light flux diameter is reduced, and when the light flux which is incident on the diffraction grating has random polarization, it becomes difficult to obtain a sufficient effect of expanding the light flux diameter.

SUMMARY

An advantage of some embodiments is to provide a display device which is provided with a light flux diameter expanding element corresponding to the polarization characteristics of incident light, and the light flux diameter expanding element.

According to some embodiments, there is provided a display device which includes a light source unit which emits a polarized light flux, and a light flux diameter expanding element onto which the polarized light flux is incident and which expands a light flux diameter of the polarized light flux and emits the light flux, in which an electric field vector in the polarized light flux which enters the light flux diameter expanding element oscillates in a first direction, in which the light flux diameter expanding element includes a first diffraction grating has a plurality of concave portions or convex portions each of which extends along the first direction and is arranged periodically in a second direction intersecting the first direction, and a second diffraction grating has a plurality of concave portions or convex portions each of which extends along the first direction and is arranged periodically in the second direction, the second diffraction grating is disposed opposite the first diffraction grating, in which a grating period of the plurality of concave portions or the convex portions of the first diffraction grating is a same as a grating period of the plurality of concave portions or the convex portions of the second diffraction grating.

In the embodiment, the first direction and the second direction intersecting the first direction are directions as viewed along a direction in which the light proceeds.

In this case, the polarized light flux which is emitted from the light source unit passes sequentially through the first diffraction grating and the second diffraction grating of the light flux diameter expanding element. Here, in the polarized light flux which is incident on the light flux diameter expanding element, the electric field vector oscillates in the first direction, and in the first diffraction grating and the second diffraction grating, the concave portions or the convex portions extending linearly along the first direction are arranged periodically. Therefore, since the polarized light flux is incident on the first diffraction grating and the second diffraction grating as a TE wave, the diffraction efficiency is high. Since, in the first diffraction grating and the second diffraction grating, the grating periods of the concave portions or the convex portions are the same period as each other, the polarized light flux is emitted from the second diffraction grating as parallel light in which the light flux diameter is expanded in the second direction.

In the display device according to some embodiments, it is preferable that the light flux diameter expanding element includes a third diffraction grating has a plurality of concave portions or convex portions each of which extends along the second direction and is arranged periodically in the first direction, the third diffraction grating is disposed opposite the second diffraction grating on an opposite side from the first diffraction grating, a fourth diffraction grating has a plurality of concave portions or convex portions each of which extends along the second direction and is arranged periodically in the first direction, the fourth diffraction grating is disposed opposite the third diffraction grating on an opposite side from the second diffraction grating, and a half-wave plate which is disposed between the second diffraction grating and the third diffraction grating, in which a grating period of the plurality of concave portions or the convex portions of the third diffraction grating is the same as a grating period of the plurality of concave portions or the convex portions of the fourth diffraction grating. In this case, the light flux which is emitted from the second diffraction grating is converted by the half-wave plate into a light flux of polarized light in which the electric field vector oscillates in the second direction, and subsequently passes sequentially through the third diffraction grating and the fourth diffraction grating. Here, in the third diffraction grating and the fourth diffraction grating, the concave portions or the convex portions extending linearly along the second direction are arranged periodically. Therefore, since the light beams which are incident on the third diffraction grating and the fourth diffraction grating are TE waves, the diffraction efficiency is high. Since, in the third diffraction grating and the fourth diffraction grating, the grating periods of the concave portions or the convex portions are the same period as each other, the light flux is emitted from the fourth diffraction grating as parallel light in which the light flux diameter is expanded in the first direction and the second direction.

In the display device according to some embodiments, it is preferable that a first transparent substrate is disposed between the first diffraction grating and the second diffraction grating, and a second transparent substrate is disposed between the third diffraction grating and the fourth diffraction grating. In this case, since it is possible to form the first diffraction grating and the second diffraction grating on the one side and the other side of the first transparent substrate, and to form the third diffraction grating and the fourth diffraction grating on the one side and the other side of the second transparent substrate, the number of transparent substrates may be small. Therefore, it is possible to obtain a reduction in the thickness of the light flux diameter expanding element.

In the display device according to the aspect of the embodiment, it is preferable that the light flux diameter expanding element includes a fifth diffraction grating has a plurality of concave portions or convex portions each of which extends along the first direction and is arranged periodically in the second direction, the fifth diffraction grating is disposed opposite the second diffraction grating between the second diffraction grating and the half-wave plate, and a sixth diffraction grating has a plurality of concave portions or convex portions each of which extends along the first direction and is arranged periodically in the second direction, the sixth diffraction grating is disposed opposite the fifth diffraction grating between the fifth diffraction grating and the half-wave plate, in which a grating period of the plurality of concave portions or the convex portions of the fifth diffraction grating is the same as both the grating period of the plurality of concave portions or the convex portions of the first diffraction grating and a grating period of the plurality of concave portions or the convex portions of the sixth diffraction grating. In this case, in addition to the second diffraction grating, each of the diffracted light beams which is emitted from the first diffraction grating is diffracted in the second direction by the fifth diffraction grating and the sixth diffraction grating. Therefore, it is possible to suitably narrow the interval in the second direction between the diffracted light beams which are emitted from the sixth diffraction grating in parallel.

In the display device according to some embodiments, it is preferable that the light flux diameter expanding element includes a seventh diffraction grating has a plurality of concave portions or convex portions each of which extends along the second direction and is arranged periodically in the first direction, the seventh diffraction grating is disposed opposite the fourth diffraction grating on an opposite side from the third diffraction grating, and an eighth diffraction grating has a plurality of concave portions or convex portions each of which extends along the second direction and is arranged periodically in the first direction, the eighth diffraction grating is disposed opposite the seventh diffraction grating on an opposite side from the fourth diffraction grating, in which a grating period of the plurality of concave portions or the convex portions of the seventh diffraction grating is the same as both the grating period of the plurality of concave portions or the convex portions of the third diffraction grating and a grating period of the plurality of concave portions or the convex portions of the eighth diffraction grating. In this case, in addition to the fourth diffraction grating, each of the diffracted light beams which is emitted from the third diffraction grating is diffracted in the first direction by the seventh diffraction grating and the eighth diffraction grating. Therefore, it is possible to suitably narrow the interval in the first direction between the diffracted light beams which are emitted from the eighth diffraction grating in parallel.

In the display device according to some embodiments, the light source unit may be provided with a polarized light source which emits the polarized light flux.

In the display device according to some embodiments, the light source unit may be provided with a light source which emits light with random polarization, and an optical element which aligns an oscillation direction of the electric field vector in the light which is emitted from the light source.

The display device according to some embodiments may further include a scanning optical system which scans the polarized light flux which is emitted from the light source unit, the scanning optical system generates an image, and a light guide system which causes a light flux which is scanned by the scanning optical system, the light guide system enters the light flux to an eye of a user, in which the light flux diameter expanding element may be disposed in an optical path from the scanning optical system to the light guide system, or in an optical path of the light guide system.

According to some embodiments, there is provided a light flux diameter expanding element which includes a first diffraction grating including a plurality of concave portions or convex portions each of which extends along a first direction and is arranged periodically in a second direction intersecting the first direction, a second diffraction grating including a plurality of concave portions or convex portions each of which extends along the first direction and is arranged periodically in the second direction, the second diffraction grating is disposed opposite the first diffraction grating, a third diffraction grating including a plurality of concave portions or convex portions each of which extends along the second direction and is arranged periodically in the first direction, the third diffraction grating is disposed opposite the second diffraction grating on an opposite side from the first diffraction grating, a fourth diffraction grating including a plurality of concave portions or convex portions each of which extends along the second direction and is arranged periodically in the first direction, the fourth diffraction grating is disposed opposite the third diffraction grating on an opposite side from the second diffraction grating, and a half-wave plate which is disposed between the second diffraction grating and the third diffraction grating, in which a grating period of the plurality of concave portions or the convex portions of the first diffraction grating is the same as a grating period of the plurality of concave portions or the convex portions of the second diffraction grating, and in which a grating period of the plurality of concave portions or the convex portions of the third diffraction grating is the same as a grating period of the plurality of concave portions or the convex portions of the fourth diffraction grating.

In this case, the polarized light flux which is emitted from the light source unit passes sequentially through the first diffraction grating and the second diffraction grating of the light flux diameter expanding element. Here, in the first diffraction grating and the second diffraction grating, the concave portions or the convex portions extending linearly along the first direction are arranged periodically. Therefore, if the electric field vector oscillates in the first direction in the polarized light flux which is incident on the light flux diameter expanding element, since the polarized light flux is incident on the first diffraction grating and the second diffraction grating as a TE wave, the diffraction efficiency is high. Since, in the first diffraction grating and the second diffraction grating, the grating periods of the concave portions or the convex portions are the same period as each other, the polarized light flux is emitted from the second diffraction grating as parallel light in which the light flux diameter is expanded in the second direction. The polarized light flux which is emitted from the light source unit passes sequentially through the third diffraction grating and the fourth diffraction grating of the light flux diameter expanding element. Here, in the third diffraction grating and the fourth diffraction grating, the concave portions or the convex portions extending linearly along the second direction are arranged periodically; however, the polarization direction of the polarized light flux which is incident on the third diffraction grating is rotated by the half-wave plate such that the electric field vector oscillates in the second direction. Therefore, since the polarized light flux which is incident on the third diffraction grating and the fourth diffraction grating is incident as TE waves, the polarized light flux is subjected to a diffraction operation. Since, in the third diffraction grating and the fourth diffraction grating, the grating periods of the concave portions or the convex portions are the same period as each other, the light flux diameter is expanded in the first direction. Therefore, parallel light in which the light flux diameter is expanded in the first direction and the second direction is emitted from the fourth diffraction grating.

BRIEF DESCRIPTION OF THE DRAWINGS

Embodiments will be described with reference to the accompanying drawings, wherein like numbers reference like elements.

FIG. 5 is an explanatory diagram illustrating an aspect of a second configuration example of a light flux diameter expanding element (a pupil expanding element) to which the embodiment is applied.

DESCRIPTION OF EXEMPLARY EMBODIMENTS

Figure 1A:
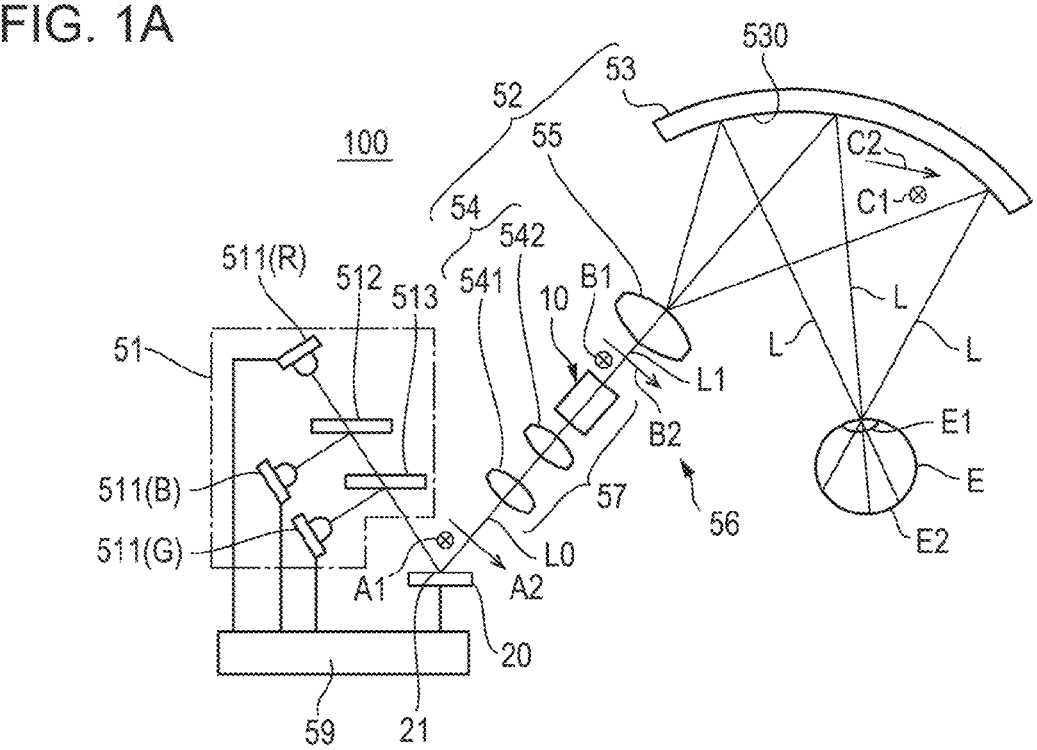
FIGS. 1A and 1B are explanatory diagrams illustrating an aspect of a retina scanning display device to which the embodiment is applied.
Figure 1B:
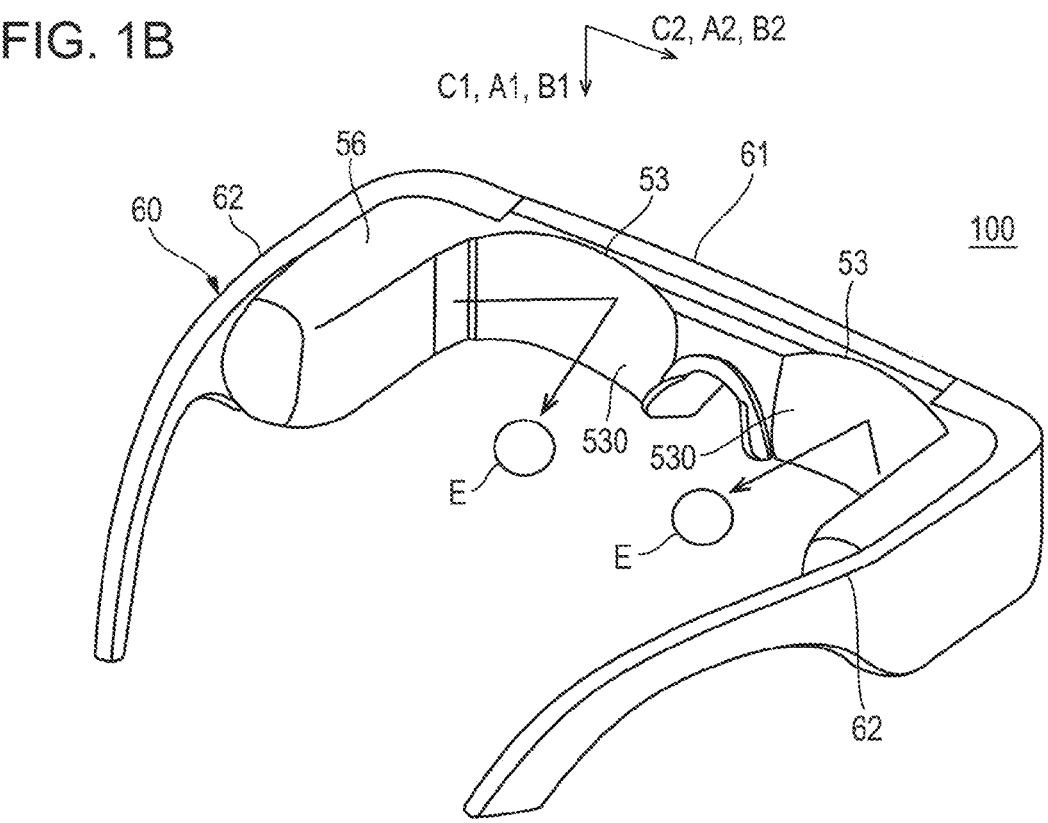
Figure 2A:
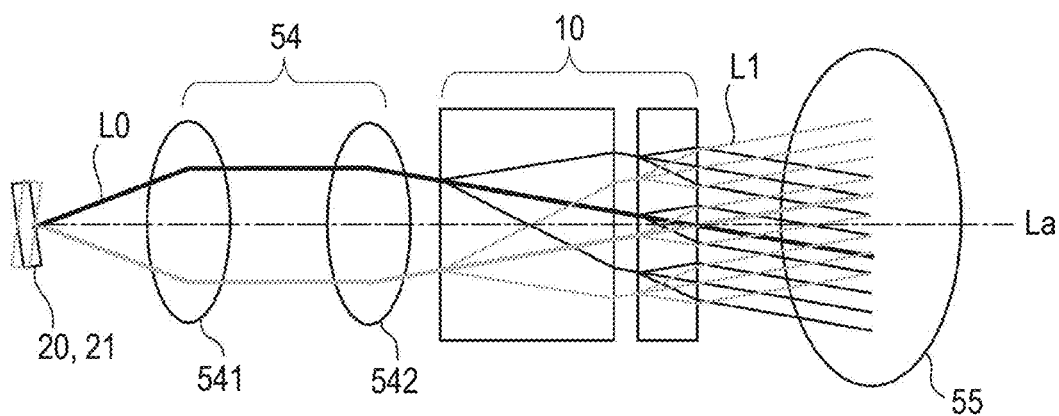
FIGS. 2A and 2B are explanatory diagrams illustrating an effect of a case in which a relay lens system is used in the retina scanning display device to which the embodiment is applied.
Figure 2B:
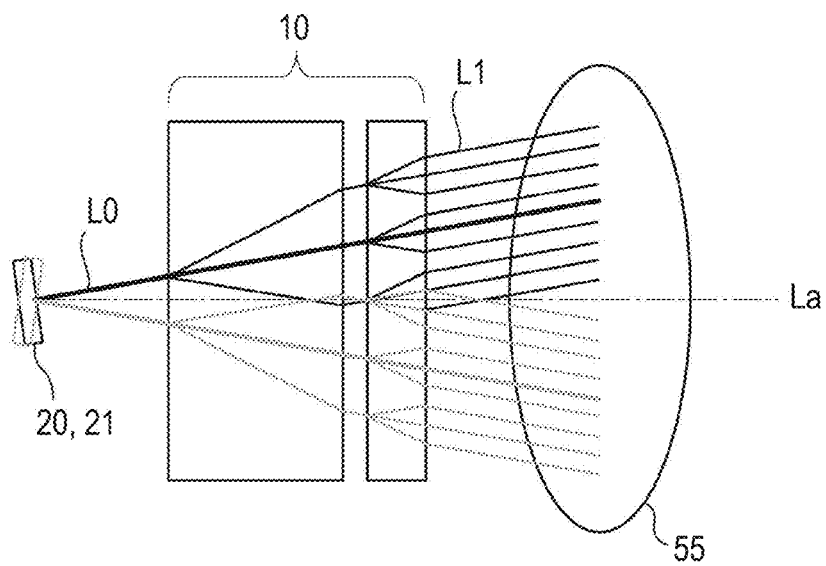
Figure 6:
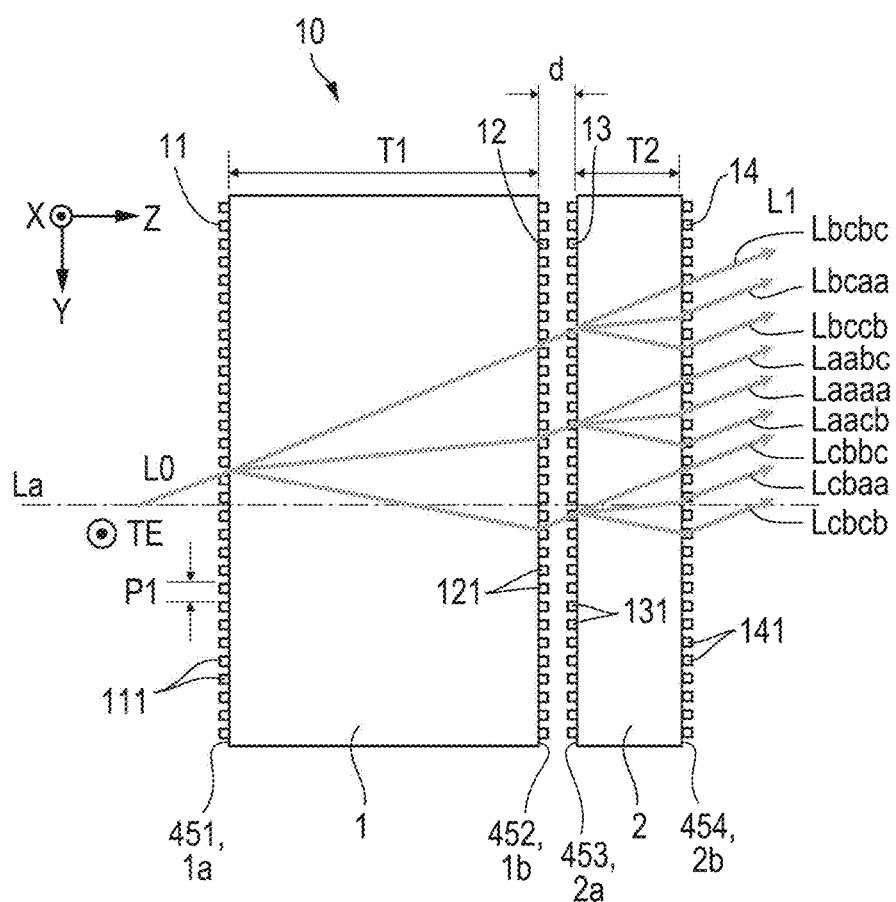
FIG. 6 is an explanatory diagram illustrating an aspect of a third configuration example of a light flux diameter expanding element (a pupil expanding element) to which the embodiment is applied.

Hereinafter, description will be given of an embodiment.
Configuration of Retina Scanning Display Device FIGS. 1A and 1B are explanatory diagrams illustrating an aspect of a retina scanning display device 100 to which the embodiment is applied, where FIG. 1A is an explanatory diagram illustrating an aspect of an optical system, and FIG. 1B is an explanatory diagram illustrating an aspect of the appearance of the display device 100. FIGS. 2A and 2B are explanatory diagrams illustrating an effect of a case in which a relay lens system 54 is used in the retina scanning display device 100 to which the embodiment is applied, where FIG. 2A is an explanatory diagram of rays in the case in which the relay lens system 54 is used, and FIG. 2B is an explanatory diagram of rays in the case in which the relay lens system 54 is not used. Note that, in FIGS. 2A and 2B, a case in which a light flux diameter expanding element 10 which is described later with reference to FIG. 6 is not shown.

In FIG. 1A, the display device 100 includes a light source unit 51, a scanning optical system 20, and a light guide system 52. The light source unit 51 emits a light flux for displaying an image, the scanning optical system 20 is provided with a scanning mirror 21 which scans the light flux which is emitted from the light source unit 51 to form an image, and the light guide system 52 causes a light flux L0 which is scanned by the scanning optical system 20 to enter an eye E of the user, and the light guide system 52 includes the relay lens system 54, a projecting lens system 55, and a reflecting member 53 on an emission side of the scanning optical system 20. For example, the relay lens system 54 is formed of two lenses 541 and 542. In the present embodiment, the relay lens system 54 is formed of an afocal optical system.

The light source unit 51 emits pre-optical modulation light source light, or modulated light which is optically modulated. In the present embodiment, the light source unit 51 is configured as a modulated light emission unit which emits optically modulated light. More specifically, the light source unit 51 includes a red laser element 511(R), a green laser element 511(G), and a blue laser element 511(B), and two half mirrors 512 and 513 which combine the optical paths of the laser elements. The red, green, and blue laser elements 511(R), 511(G), and 511(B) emit red light (R), green light (G), and blue light (B), respectively. The red laser element 511(R), the green laser element 511(G), and the blue laser element 511(B) each emits a light flux which is modulated to light intensities corresponding to each dot of an image to be displayed under the control of a control unit 59.

The scanning optical system 20 scans incident light in a first scanning direction A1 and a second scanning direction A2 which intersects the first scanning direction A1, and the light flux L0 which is scanned is projected onto the reflecting member 53 via the relay lens system 54 and the projecting lens system 55. The operations of the scanning optical system 20 are also carried out under the control of the control unit 59. For example, it is possible to realize the scanning optical system 20 with a micro mirror device which is formed using a silicon substrate or the like, by employing micro electro mechanical systems (MEMS) technology.

In the present embodiment, the display device 100 is configured as a retina scanning projection display device. Therefore, the reflecting member 53 is provided with a concave surface shaped reflecting surface 530 which reflects the projected light flux L0 to cause the light flux L0 to enter the eye E of the user as a light flux L. In the display device 100 (the retina scanning projection display device), the scanning optical system 20 causes the user to recognize an image due to the light flux L0, which is scanned in the first scanning direction A1 and the second scanning direction A2 which intersects the first scanning direction A1, being reflected in a first incident direction C1 corresponding to the first scanning direction A1 and a second incident direction C2 corresponding to the second scanning direction A2 by the reflecting surface 530 of the reflecting member 53 to reach a retina E2 via a pupil E1. In the present embodiment, the reflecting member 53 is a partial transmission reflective combiner. Therefore, since external light also enters the eye via the reflecting member 53 (the combiner), the user may recognize an image in which an image which is formed by the display device 100 is superimposed on the external light (a background). In other words, the display device 100 is configured as a see-through retina scanning projection device.

In the display device 100, the light flux diameter expanding element 10 which uses the diffraction gratings described later is disposed in the optical path from the scanning optical system 20 to the reflecting member 53 (the optical path from the scanning optical system 20 to the light guide system 52 or the optical path of the light guide system 52). The light flux diameter expanding element 10 expands the light flux which is output from the scanning optical system 20 in one of a first expansion direction B1 corresponding to the first scanning direction A1 (the first incident direction C1) and a second expansion direction B2 corresponding to the second scanning direction A2 (the second incident direction C2).

The light flux diameter expanding element 10 may be disposed in either the optical path from the scanning optical system 20 to the light guide system 52 or the optical path of the light guide system 52; however, in the present embodiment, the light flux diameter expanding element 10 is disposed in the optical path of the light guide system 52. More specifically, within the optical path of the light guide system 52, the light flux diameter expanding element 10 is disposed between the lens 542 of the emission side of the relay lens system 54 and the projecting lens system 55. Therefore, the scanning mirror 21 of the scanning optical system 20 is disposed in a position of the entrance pupil of an optical system 57 which is formed of the light flux diameter expanding element 10 and the relay lens system 54, and a final emission surface of the light flux diameter expanding element 10 is disposed in a position of the exit pupil of the optical system 57.

When the display device 100 which is configured in this manner is configured as a see-through head mounted display (an eyeglass display), as illustrated in FIG. 1B, the display device 100 is formed in the shape of eyeglasses. When modulated light is caused to be incident on both left and right eyes E of an observer, the display device 100 includes a frame 60 which supports the reflecting member 53 for a left eye and the reflecting member 53 for a right eye with a front portion 61, and an optical unit 56 containing the optical components described with reference to FIG. 1A is provided for each of left and right temples 62 of the frame 60. Here, although there is a case in which all of the light source unit 51, the scanning optical system 20, the relay lens system 54, the light flux diameter expanding element 10, and the projecting lens system 55 are provided in the optical unit 56, a configuration may be adopted in which only the scanning optical system 20, the relay lens system 54, the light flux diameter expanding element 10, and the projecting lens system 55 are provided in the optical unit 56, and the optical unit 56 is connected to the light source unit 51 by an optical cable or the like.

In the display device 100 of the present embodiment, in the image which is recognized by the user, the second incident direction C2 of the light flux L from the reflecting member 53 corresponds to a horizontal direction in which the eyes of the user line up, and thus, the second scanning direction A2 in the scanning optical system 20 and the second expansion direction B2 in the light flux diameter expanding element 10 correspond to the horizontal direction in the image. The first incident direction C1 of the light flux L from the reflecting member 53 corresponds to a vertical direction which intersects the horizontal direction in which the eyes of the user line up, and thus, the first scanning direction A1 in the scanning optical system 20 and the first expansion direction B1 in the light flux diameter expanding element 10 correspond to the vertical direction in the image.

In the display device 100 which is configured in this manner, the light flux L0 (a laser beam) which is scanned by the scanning mirror 21 enters the light flux diameter expanding element 10 via the relay lens system 54, and a light flux L1 in which the light flux diameter is expanded by the light flux diameter expanding element 10 enters the projecting lens system 55. Here, the relay lens system 54 is an afocal optical system for emitting a light flux which is parallel light while maintaining the light flux in parallel light form. Therefore, as illustrated in FIG. 2A, since it is possible to assume that the light flux L1 in which the light flux diameter is expanded by the light flux diameter expanding element 10 is scanned centered on a point at which the emission surface of the light flux diameter expanding element 10 and a device optical axis La intersect, it is possible to reduce the sizes of the light flux diameter expanding element 10 and the projecting lens system 55. In contrast, when the relay lens system 54 is not used, as illustrated in FIG. 2B, since the center of rotation of the light flux which is scanned is the position of the scanning mirror 21, the light flux L0 and the light flux L1 are scanned widely in the light flux diameter expanding element 10. Accordingly, the light flux diameter expanding element 10 and the projecting lens system 55 become larger. Therefore, it is possible to reduce the size of the light flux diameter expanding element 10 and the projecting lens system 55 by using the relay lens system 54, and as a result, when applied to the head mounted display illustrated in FIG. 1B, it is possible to reduce the size of the vicinity of the temporal region in which the optical system is disposed.

First Configuration Example of Light Flux Diameter Expanding Element 10

Figure 3A:
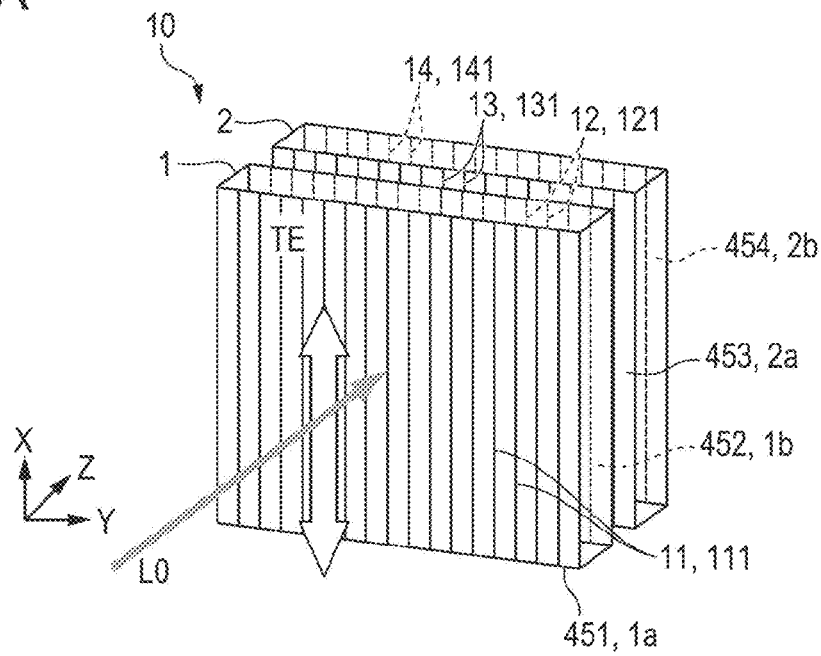
FIGS. 3A and 3B are explanatory diagrams illustrating an aspect of a first configuration example of a light flux diameter expanding element (a pupil expanding element) to which the embodiment is applied.
Figure 3B:
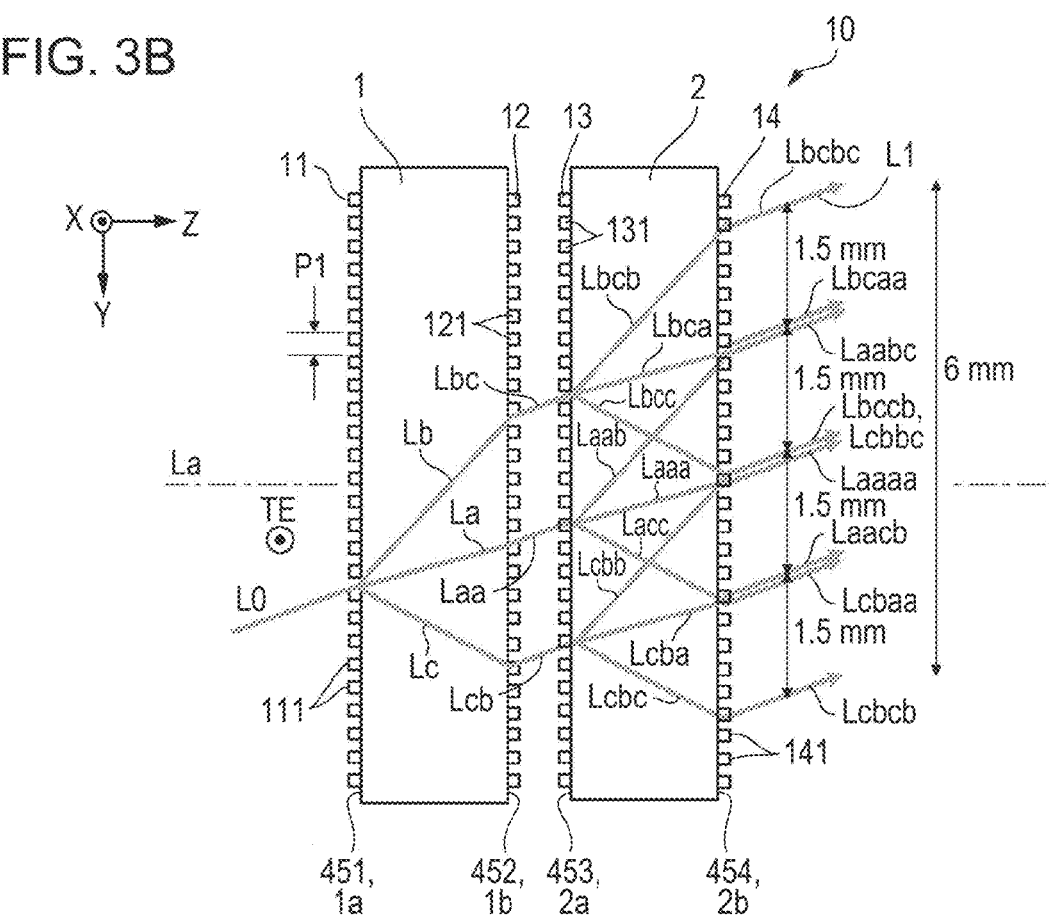
Figure 4A:
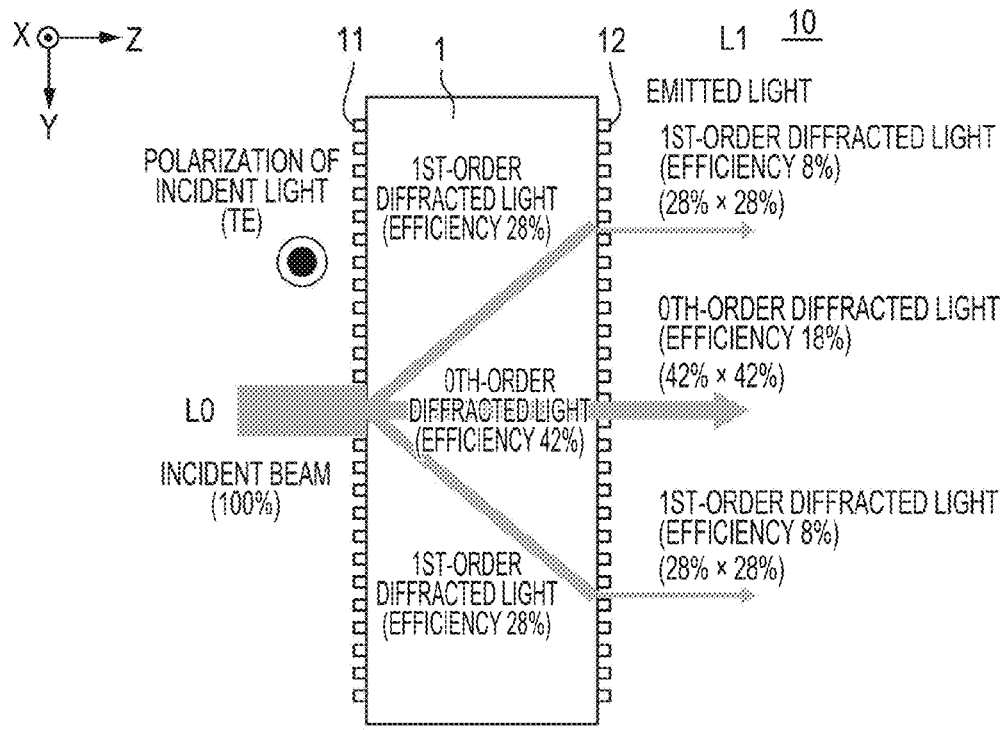
FIGS. 4A and 4B are explanatory diagrams illustrating the relationship between the polarization direction of the light flux and the diffraction function of the light flux diameter expanding element (the pupil expanding element).
Figure 4B:
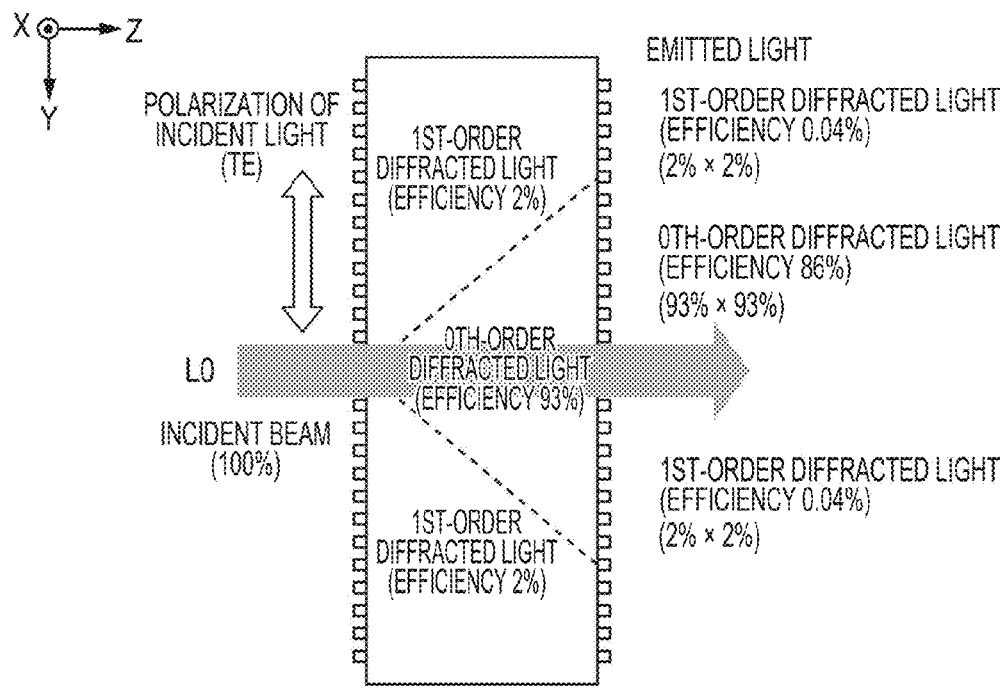

FIGS. 3A and 3B are explanatory diagrams illustrating an aspect of the first configuration example of the light flux diameter expanding element 10 (the pupil expanding element) to which the embodiment is applied, where FIG. 3A is an explanatory diagram schematically illustrating the configuration when the light flux diameter expanding element 10 is viewed from the light entrance side, and FIG. 3B is a ray diagram of the light flux which passes through the light flux diameter expanding element 10. FIGS. 4A and 4B are explanatory diagrams illustrating the relationship between the polarization direction of the light flux L0 and the diffraction function in the light flux diameter expanding element 10 (the pupil expanding element), where FIG. 4A is an explanatory diagram illustrating the relationship between the polarization direction of the light flux L0 and the diffraction function in the light flux diameter expanding element 10 of the present embodiment, and FIG. 4B is an explanatory diagram illustrating the relationship between the polarization direction of the light flux L0 and the diffraction function in the light flux diameter expanding element 10 of a reference example. Note that, in FIG. 3B, only the rays which are emitted from the light flux diameter expanding element 10 as parallel light are illustrated.

In the description hereinafter, in the surface on which the diffraction grating is formed, in the surface intersecting the device optical axis La which extends in the Z direction, of a first direction and a second direction which orthogonally intersect each other, the first direction is set to the X direction and the second direction is set to the Y direction. Here, for example, the first direction X corresponds to the first expansion direction B1 (the vertical direction) illustrated in FIGS. 1A and 1B, and the second direction Y corresponds to the second expansion direction B2 (the horizontal direction) illustrated in FIGS. 1A and 1B.

As illustrated in FIGS. 3A and 3B, in the light flux diameter expanding element 10 (the pupil expanding element) illustrated in FIGS. 1A and 1B, four diffraction gratings 11, 12, 13, and 14 face each other, and the diffraction angles thereof are matched by rendering grating periods P1 of each the same. Here, the diffraction gratings 11, 12, 13, and 14 are in the following relationship with "a first diffraction grating", "a second diffraction grating", "a fifth diffraction grating" and "a sixth diffraction grating" in the embodiment.

The diffraction grating 11="the first diffraction grating" in the embodiment.
The diffraction grating 12="the second diffraction grating" in the embodiment.
The diffraction grating 13="the fifth diffraction grating" in the embodiment.
The diffraction grating 14="the sixth diffraction grating" in the embodiment.

The light flux diameter expanding element 10 of the present embodiment includes the diffraction grating 11 and the diffraction grating 12. The diffraction grating 11 is provided with a grating pattern 111 which is formed of convex portions which extend linearly along the first direction X in the intra-surface direction of a first surface 451 intersecting the device optical axis La, and the diffraction grating 12 is provided with a grating pattern 121 which is formed of convex portions which extend linearly along the first direction X in the intra-surface direction of a second surface 452 facing the emission side of the first surface 451. The grating pattern 111 and the grating pattern 121 are arranged periodically in a direction parallel to the second direction Y in the diffraction grating 11 and the diffraction grating 12, respectively. The light flux diameter expanding element 10 includes the diffraction grating 13 and the diffraction grating 14. The diffraction grating 13 is provided with a grating pattern 131 which is formed of convex portions which extend linearly along the first direction X in the intra-surface direction of a third surface 453 facing the second surface 452 on the opposite side from the first surface 451, and the diffraction grating 14 is provided with a grating pattern 141 which is formed of convex portions which extend linearly along the first direction X in the intra-surface direction of a fourth surface 454 facing the third surface 453 on the opposite side from the second surface 452. The grating pattern 131 and the grating pattern 141 are arranged periodically in a direction parallel to the second direction Y in the diffraction grating 13 and the diffraction grating 14, respectively. In the light flux diameter expanding element 10, the diffraction grating 11 and the diffraction grating 12 are disposed opposite each other, the diffraction grating 13 is disposed opposite the diffraction grating 12 on the opposite side from the diffraction grating 11, and the diffraction grating 14 is disposed opposite the diffraction grating 13 on the opposite side from the diffraction grating 12. Here, the grating period P1 is the same in the grating patterns 111, 121, 131, and 141.

In the present embodiment, in the diffraction gratings 11, 12, 13, and 14, transparent substrates are disposed between two adjacent diffraction gratings. More specifically, in the first surface 451, the second surface 452, the third surface 453, and the fourth surface 454, either one of the two surfaces which are adjacent in the optical axis direction is formed on one surface of a transparent substrate, and the other is formed on the other surface of the transparent substrate. In the present embodiment, the first surface 451 is a one surface 1a of a transparent substrate 1 (a first transparent substrate), and the second surface 452 is another surface 1b of the transparent substrate 1. The third surface 453 is a one surface 2a of a transparent substrate 2 (a third transparent substrate), and the fourth surface 454 is another surface 2b of the transparent substrate 2. Each of the grating patterns 111, 121, 131, and 141 is formed of a film which is formed on the transparent substrate 1 or the transparent substrate 2. The transparent substrates 1 and 2 are transparent substrates with the same thickness. Therefore, the interval between the first surface 451 and the second surface 452 is equal to the interval between the third surface 453 and the fourth surface 454. Note that, each of the grating patterns 111, 121, 131, and 141 may be formed as concave portions which are formed on the transparent substrate 1 or the transparent substrate 2 using etching or the like.

In the light flux diameter expanding element 10 which is configured in this manner, the red laser element 511(R), the green laser element 511(G), and the blue laser element 511(B) are used as light sources in the light source unit 51 which is described with reference to FIGS. 1A and 1B, and the light sources are polarized light sources which emit the light flux L0 (a polarized light flux) of polarized light in which the electric field vector oscillates in the first direction X when incident on the light flux diameter expanding element 10. Therefore, the light flux L0 which is incident on the light flux diameter expanding element 10 enters, as a TE wave, the diffraction gratings 11, 12, 13, and 14 which are provided with the grating patterns 111, 121, 131, and 141 which are formed of convex portions which extend linearly in the first direction X.

Therefore, focusing on the diffraction gratings 11 and 12, as illustrated in FIG. 4A, the light flux L0 is diffracted in the second direction Y by the diffraction gratings 11 and 12. For example, when the grating period P1 of the grating patterns 111 and 121 is 0.48 μm, 0-th order diffraction efficiency is 42%, and 1-st order diffraction efficiency is 28%. Therefore, in the light flux which is emitted from the diffraction grating 12, three emission beams which are emitted at the same angle as the incident light contain 18% 0-th order diffracted light in relation to the incident light at 0-th order diffraction× 0-th order diffraction, and 8% 1-st order diffracted light in relation to the incident light at 1-st order diffraction×1-st order diffraction. If 0-th order diffraction efficiency and 1-st order diffraction efficiency are 30%, in the light flux which is emitted from the diffraction grating 12, three emission beams which are emitted at the same angle as the incident light contain 9% 0-th order diffracted light (0-th order diffraction×0-th order diffraction) in relation to the incident light, and 9% 1-st order diffracted light (1-st order diffraction×1-st order diffraction) in relation to the incident light.

In contrast, as illustrated in FIG. 4B, when the light flux L0 is incident on the diffraction gratings 11 and 12 as a TM wave in which the electric field vector oscillates in the second direction Y (the second direction), 0-th order diffraction efficiency is 93%, and 1-st order diffraction efficiency is 2%. Therefore, in the light flux which is emitted from the diffraction grating 12, three emission beams which are emitted at the same angle as the incident light contain 86% 0-th order diffracted light (0-th order diffraction×0-th order diffraction) in relation to the incident light, and 0.04% 1-st order diffracted light (1-st order diffraction×1-st order diffraction) in relation to the incident light. Therefore, in the reference example illustrated in FIG. 4B, a sufficient function of expanding the light flux diameter in the second direction Y may not be obtained.

In the present embodiment, as illustrated in FIGS. 3A and 3B, the grating patterns 111, 121, 131, and 141 which extend in the first direction X with the same grating period P1 are formed on the four diffraction gratings 11, 12, 13, and 14. Therefore, in the light flux diameter expanding element 10, when the light flux L0 enters the diffraction grating 11, 0-th order diffracted light La, +1-st order diffracted light Lb, and −1-st order diffracted light Lc are generated, and the diffracted light beams enter the diffraction grating 12. Therefore, in the diffraction grating 12, 0-th order diffracted light Laa, +1-st order diffracted light (not shown), and −1-st order diffracted light (not shown) are generated from 0-th order diffracted light La, 0-th order diffracted light (not shown), +1-st order diffracted light (not shown), and −1-st order diffracted light Lbc are generated from +1-st order diffracted light Lb, 0-th order diffracted light (not shown), +1-st order diffracted light Lcb, and −1-st order diffracted light (not shown) are generated from −1-st order diffracted light Lc, and the diffracted light enters the diffraction grating 13. Therefore, in the diffraction grating 13, 0-th order diffracted light Laaa, +1-st order diffracted light Laab, and −1-st order diffracted light Laac are generated from 0-th order diffracted light Laa, 0-th order diffracted light Lbca, +1-st order diffracted light Lbcb, and −1-st order diffracted light Lbcc are generated from −1-st order diffracted light Lbc, 0-th order diffracted light Lcba, +1-st order diffracted light Lcbb, and −1-st order diffracted light Lcbc are generated from +1-st order diffracted light Lcb, and the diffracted light enters the diffraction grating 14.

As a result, −1-st order diffracted light Lbcbc which is generated from +1-st order diffracted light Lbcb is emitted from the diffraction grating 14. 0-th order diffracted light Lbcaa which is generated from 0-th order diffracted light Lbca, and −1-st order diffracted light Laabc which is generated from +1-st order diffracted light Laab overlap and are emitted from the diffraction grating 14. +1-st order diffracted light Lbccb which is generated from −1-st order diffracted light Lbcc, 0-th order diffracted light Laaaa which is generated from 0-th order diffracted light Laaa, and −1-st order diffracted light Lcbbc which is generated from +1-st order diffracted light Lcbb overlap and are emitted from the diffraction grating 14. +1-st order diffracted light Laacb which is generated from −1-st order diffracted light Laac, and 0-th order diffracted light Lcbaa which is generated from 0-th order diffracted light Lcba overlap and are emitted from the diffraction grating 14. +1-st order diffracted light Lcbcb which is generated from −1-st order diffracted light Lcbc is emitted from the diffraction grating 14.

Here, −1-st order diffracted light Lbcbc, +1-st order diffracted light Lbcaa (−1-st order diffracted light Laabc), +1-st order diffracted light Lbccb (0-th order diffracted light Laaaa and −1-st order diffracted light Lcbbc), +1-st order diffracted light Laacb (0-th order diffracted light Lcbaa), and +1-st order diffracted light Lcbcb are light beams which proceed parallel to each other from five locations separated in the second direction Y, and the light flux L0 is emitted as the light flux L1 in which the diameter is expanded in the second direction Y by 6 mm, for example. When the diameter of the pupil E1 illustrated in FIGS. 1A and 1B is 2 mm, it is possible to view the image even if the eye E moved in the second direction Y within a range of a total of 8 mm, which is obtained by adding 1 mm of the radius of the pupil E1 to both sides of 6 mm of the diameter of the light flux L1. In the light flux L1, the interval between the diffracted light beams in the second direction Y is 1.5 mm, and the interval is narrow.

In the present embodiment, the first surface 451 is the one surface 1a of the transparent substrate 1, the second surface 452 is the other surface 1b of the transparent substrate 1, the third surface 453 is the one surface 2a of the transparent substrate 2, and the fourth surface 454 is the other surface 2b of the transparent substrate 2. Therefore, since it is possible to form the light flux diameter expanding element 10 which expands the diameter in the second direction Y using two transparent substrates (the transparent substrates 1 and 2), it is possible to obtain a reduction in thickness and a reduction in cost of the light flux diameter expanding element 10.

Second Configuration Example of Light Flux Diameter Expanding Element 10

FIG. 5 is an explanatory diagram illustrating an aspect of the second configuration example of the light flux diameter expanding element 10 (the pupil expanding element) to which the embodiment is applied. Note that, since the basic configuration of the present embodiment and the configuration example described later is the same as the configuration example 1, the same reference symbols will be applied to the shared components, and description thereof will be omitted.

In the configuration example illustrated in FIGS. 3A and 3B, the first surface 451 and the second surface 452 are the substrate surfaces of the same transparent substrate 1, and the third surface 453 and the fourth surface 454 are the substrate surfaces of the same transparent substrate 2; however, as illustrated in FIG. 5, each of the first surface 451, the second surface 452, the third surface 453, and the fourth surface 454 may be a separate substrate surface of the transparent substrate. For example, the first surface 451 is a substrate surface 101a of one side of a transparent substrate 101, and the second surface 452 is a substrate surface 102a of one side of a transparent substrate 102. A surface 101b of the opposite side of the transparent substrate 101 from the substrate surface 101a is bonded to a surface 102b of the opposite side of the transparent substrate 102 from the substrate surface 102a using a transparent adhesive 105a. As illustrated in FIG. 5, the third surface 453 is a substrate surface 103a of one side of a transparent substrate 103, and the fourth surface 454 is a substrate surface 104a of one side of a transparent substrate 104. A surface 103b of the opposite side of the transparent substrate 103 from the substrate surface 103a is bonded to a surface 104b of the opposite side of the transparent substrate 104 from the substrate surface 104a using a transparent adhesive 105b.

In this case, when forming the grating pattern, since the grating pattern may be formed on one surface of an individual transparent substrate, it is possible to efficiently carry out the formation process of the grating pattern.

Third Configuration Example of Light Flux Diameter Expanding Element 10

FIG. 6 is an explanatory diagram illustrating an aspect of the third configuration example of the light flux diameter expanding element 10 (the pupil expanding element) to which the embodiment is applied. In the configuration examples 1 and 2 described with reference to FIGS. 3A, 3B, and 5, the interval between the first surface 451 and the second surface 452 is equal to the interval between the third surface 453 and the fourth surface 454; however, as illustrated in FIG. 6, in the present example, the interval between the first surface 451 and the second surface 452 differs from the interval between the third surface 453 and the fourth surface 454. For example, since a thickness T1 of the transparent substrate 1 is greater than a thickness T2 of the transparent substrate 2, the interval between the first surface 451 and the second surface 452 is greater than the interval between the third surface 453 and the fourth surface 454.

Therefore, since it is possible to suitably set the emission position in the second direction Y of each diffracted light which is finally emitted, it is possible to suppress the variation in the light intensity in the second direction Y to a small amount. For example, glass with a refractive index of 1.52 is used as the transparent substrate 1 and the transparent substrate 2, and surface-relief diffraction gratings with a grating period of 1 μm are used as the diffraction grating 11, the diffraction grating 12, the diffraction grating 13, and the diffraction grating 14. In this case, the thickness T1 of the transparent substrate 1 is set to 9 mm, the thickness T2 of the transparent substrate 2 is set to 3 mm, and an interval d between the transparent substrate 1 and the transparent substrate 2 is set to 1 mm. As a result, when the light flux L0 which is incident at an angle of incidence of 10° is emitted as the light flux L1 in which the diameter is expanded to 6 mm in the second direction Y, −1-st order diffracted light Lbcbc, +1-st order diffracted light Lbcaa, −1-st order diffracted light Laabc, +1-st order diffracted light Lbccb, 0-th order diffracted light Laaaa, −1-st order diffracted light Lcbbc, +1-st order diffracted light Laacb, 0-th order diffracted light Lcbaa, and +1-st order diffracted light Lcbcb are emitted from nine locations which are separated in the second direction Y as light beams which proceed parallel to each other. Here, using the position indicated by the dot-and-dash line in FIG. 6 as an origin point, the emission position coordinates are the results illustrated in table, where the nine emission position coordinates are y1, y2 ... y8, y9. Note that, table illustrates the results of a case in which laser beams of red light (638 nm), green light (520 nm), and blue light (450 nm) are incident, and the unit of the coordinates is mm.

TABLE

| Emission position | Incident laser wavelength | | |
| coordinate y | Red (638 nm) | Green (520 nm) | Blue (450 nm) |
| --- | --- | --- | --- |
| y9 | 8.46 | 7.04 | 6.28 |
| y8 | 6.91 | 5.84 | 5.28 |
| y7 | 5.60 | 4.80 | 4.38 |
| y6 | 3.81 | 3.46 | 3.27 |
| y5 | 2.26 | 2.26 | 2.26 |
| y4 | 0.95 | 1.21 | 1.36 |
| y3 | −0.11 | 0.31 | 0.57 |

TABLE-continued

| Emission position | Incident laser wavelength | | |
| coordinate y | Red (638 nm) | Green (520 nm) | Blue (450 nm) |
| --- | --- | --- | --- |
| y2 | −1.66 | −0.88 | −0.44 |
| y1 | −2.97 | −1.93 | −1.34 |

As can be understood from table, in the case of the red light, it is possible to emit the diffracted light which is emitted at the same angle as the light flux L0 (the incident light flux) across a range of approximately 11.43 mm at an interval of approximately 1.06 mm to 1.79 mm, in the case of the green light, it is possible to emit the diffracted light across a range of approximately 8.97 mm at an interval of approximately 0.90 mm to 1.34 mm, and in the case of the blue light, it is possible to emit the diffracted light across a range of approximately 7.62 mm at an interval of approximately 0.79 mm to 1.11 mm.

Fourth Configuration Example of Light Flux Diameter Expanding Element 10

Figure 7A:
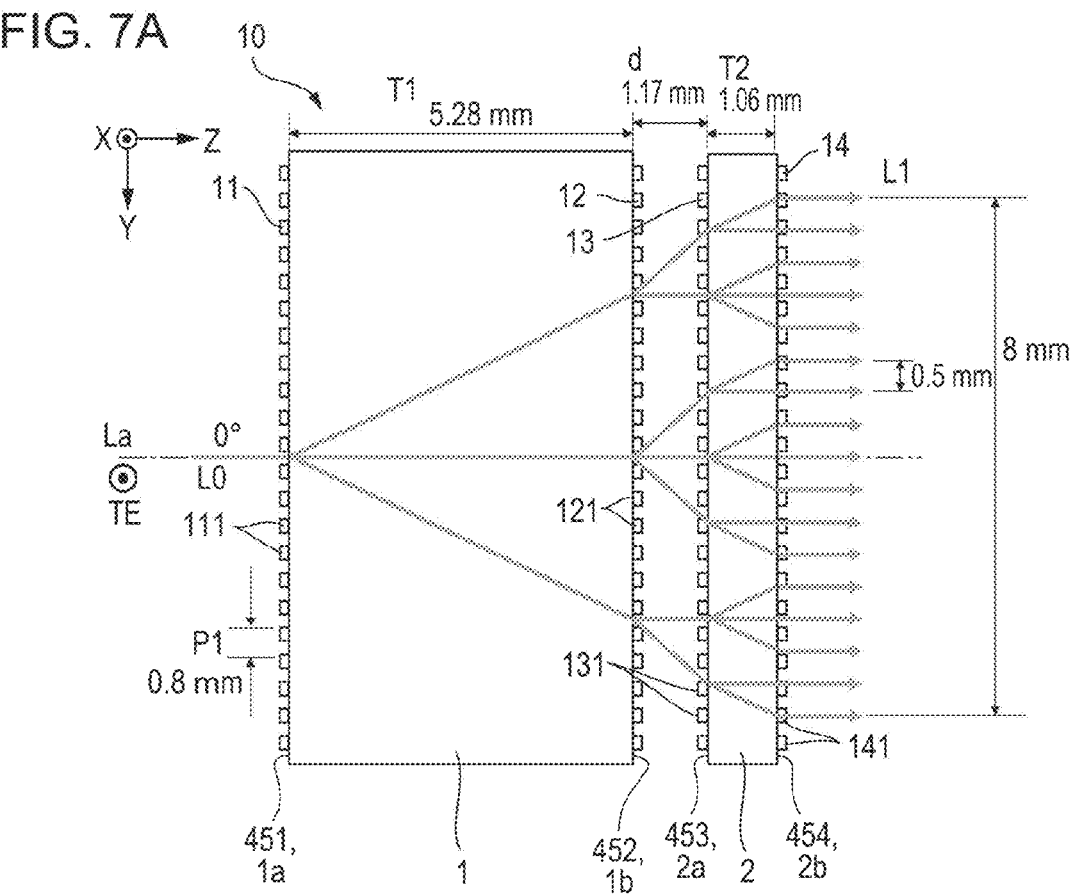
FIGS. 7A and 7B are explanatory diagrams illustrating an aspect of a fourth configuration example of a light flux diameter expanding element (a pupil expanding element) to which the embodiment is applied.
Figure 7B:
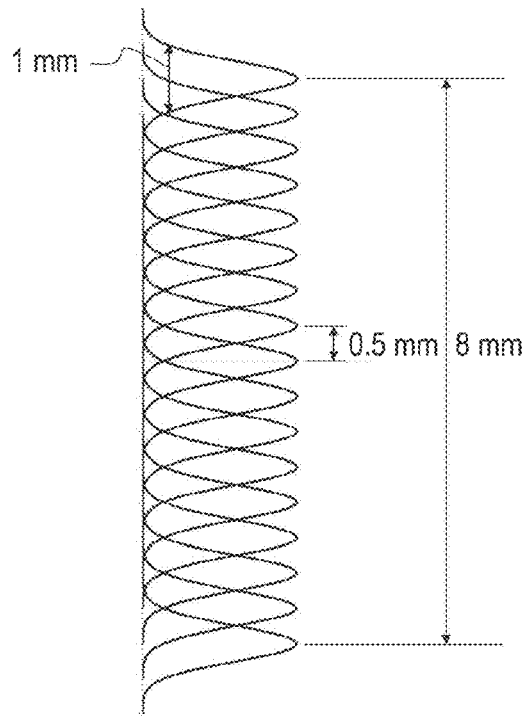

FIGS. 7A and 7B are explanatory diagrams illustrating an aspect of the fourth configuration example of the light flux diameter expanding element 10 (the pupil expanding element) to which the embodiment is applied, where FIG. 7A is an explanatory diagram illustrating the configuration of the light flux diameter expanding element 10, and FIG. 7B is an explanatory diagram illustrating the positional relationship of the diffracted light beams. In the present embodiment, as illustrated in FIGS. 7A and 7B, according to the combination of 0-th order diffracted light, +1-st order diffracted light, and −1-st order diffracted light, a configuration is adopted in which the interval between the diffracted light beams of the green light which are adjacent to each other across a range of 8 mm in the second direction Y as the light flux L1 which contains rays with angles of emission equal to the angles of incidence of the light flux L0 is 0.5 mm. More specifically, glass with a refractive index of 1.52 is used as the transparent substrates 1 and 2, and surface-relief diffraction gratings with a grating period P1 of 0.8 μm are used as the diffraction gratings 11, 12, 13, and 14. In this case, the thickness T1 of the transparent substrate 1 is set to 5.28 mm, the thickness T2 of the transparent substrate 2 is set to 1.06 mm, and the interval d between the transparent substrate 1 and the transparent substrate 2 is set to 1.07 mm.

In this case, in the light flux L1, it is possible to prevent the generation of a space in which the light between the diffracted light beams is substantially not present. For example, the light sources (the red laser element 511(R), the green laser element 511(G), and the blue laser element 511(B)) illustrated in FIG. 1A emit light in which the intensity distribution in the diameter direction of the light flux is Gaussian distribution. As a result, the intensity distribution of the light flux L0 (the laser beam) which enters the light flux diameter expanding element 10 is Gaussian distribution, and the light flux diameter at which the peak of the intensity is $1/e^2$ (where e is the base of a natural logarithm) times is 1 mm. In this case, if the interval between the 17 diffracted light beams which are adjacent to each other across a range of 8 mm is 0.5 mm, it is possible to fill the space between the beams which are adjacent across the range of 8 mm with light. In other words, the light which is emitted from the diffraction grating 14 becomes light which is distributed such that light of a greater intensity than $1/e^2$ (where e is the base of a natural logarithm) times the peak value of the intensity of the light which enters the diffraction grating 11 continues in the direction of the diameter of the light flux.

Fifth Configuration Example of Light Flux Diameter Expanding Element 10

Figure 8A:
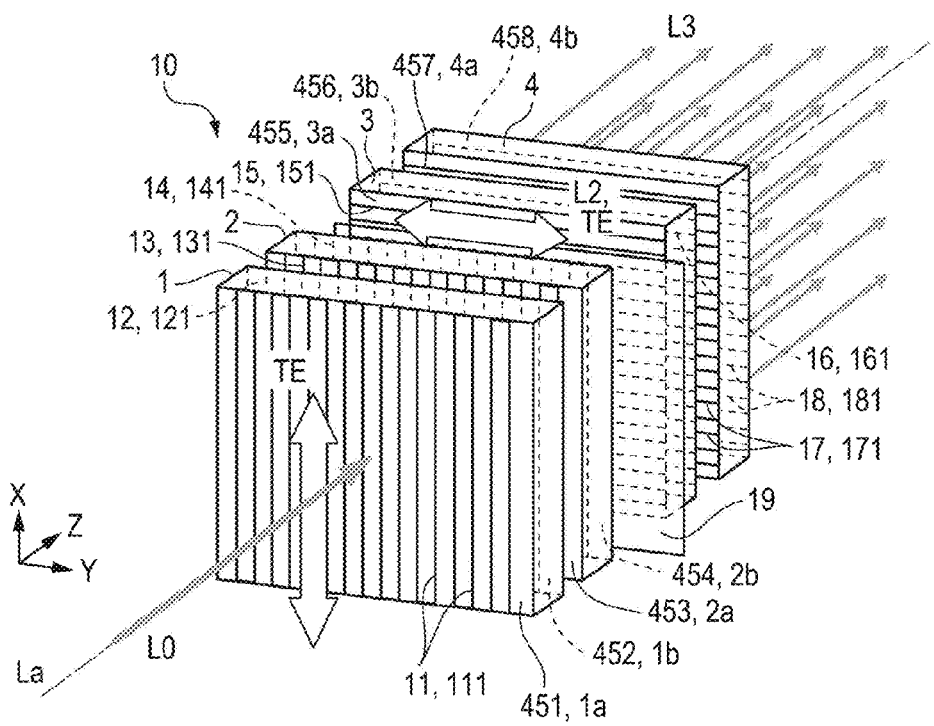
FIGS. 8A to 8C are explanatory diagrams illustrating an aspect of a fifth configuration example of a light flux diameter expanding element (a pupil expanding element) to which the embodiment is applied.
Figure 8B:
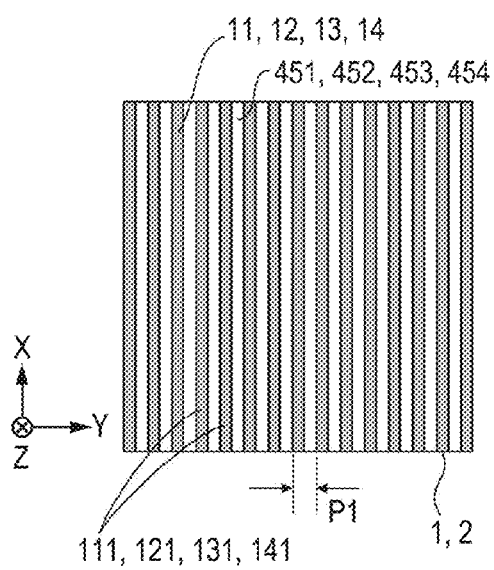
Figure 8C:
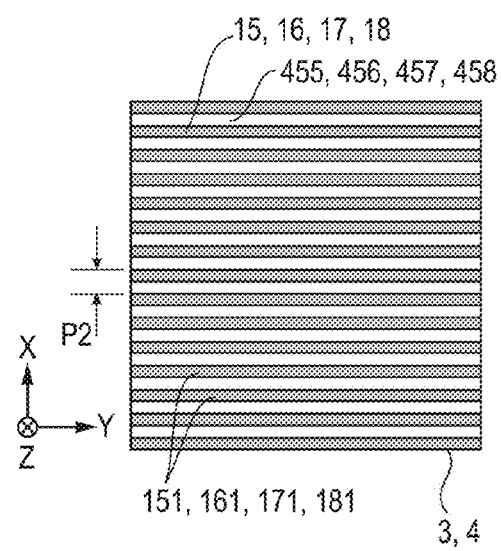

FIGS. 8A to 8C are explanatory diagrams illustrating an aspect of the fifth configuration example of the light flux diameter expanding element 10 (the pupil expanding element) to which the embodiment is applied, where FIG. 8A is an explanatory diagram schematically illustrating the configuration when the light flux diameter expanding element 10 is viewed from the light entrance side, FIG. 8B is an explanatory diagram of the grating patterns 111, 121, 131, and 141 of the diffraction gratings 11, 12, 13, and 14, and FIG. 8C is an explanatory diagram of grating patterns 151, 161, 171, and 181 of diffraction gratings 15, 16, 17, and 18.

As illustrated in FIGS. 8A to 8C, in the light flux diameter expanding element 10 (the pupil expanding element) of the present embodiment, four diffraction gratings 11, 12, 13, and 14 which are provided with the grating patterns 111, 121, 131, and 141 which are formed of convex portions which extend linearly in the first direction X are disposed in order opposite each other, and the diffraction angles thereof are matched by rendering the grating periods P1 of each the same. In the light flux diameter expanding element 10 of the present embodiment, the four diffraction gratings 15, 16, 17, and 18 which are provided with the grating patterns 151, 161, 171, and 181 which are formed of convex portions which extend linearly in the second direction Y are disposed in order opposite each other, and the diffraction angles thereof are matched by rendering the grating periods P2 of each the same. A half-wave plate 19 is disposed between the diffraction grating 14 and the diffraction grating 15.

Here, the diffraction gratings 11, 12, 13, 14, 15, 16, 17, and 18 are in the following relationship with "the first diffraction grating", "the second diffraction grating", "a third diffraction grating", "a fourth diffraction grating", "the fifth diffraction grating", "the sixth diffraction grating", "a seventh diffraction grating", and "an eighth diffraction grating" in the embodiment.

The diffraction grating 11="the first diffraction grating" in the embodiment.
The diffraction grating 12="the second diffraction grating" in the embodiment.
The diffraction grating 13="the fifth diffraction grating" in the embodiment.
The diffraction grating 14="the sixth diffraction grating" in the embodiment.
The diffraction grating 15="the third diffraction grating" in the embodiment.
The diffraction grating 16="the fourth diffraction grating" in the embodiment.
The diffraction grating 17="the seventh diffraction grating" in the embodiment.
The diffraction grating 18="the eighth diffraction grating" in the embodiment.

Therefore, the light flux diameter expanding element 10 of the present embodiment includes the four diffraction gratings 11, 12, 15, and 16 (the first diffraction grating, the second diffraction grating, the third diffraction grating, and the fourth diffraction grating) which are disposed opposite each other, and the half-wave plate 19 which is disposed between the diffraction grating 12 (the second diffraction grating) and the diffraction grating 15 (the third diffraction grating). The light flux diameter expanding element 10 includes the diffraction grating 13 (the fifth diffraction grating) which is disposed opposite the diffraction grating 12 (the second diffraction grating) between the diffraction grating 12 (the second diffraction grating) and the half-wave plate 19, and the diffraction grating 14 (the sixth diffraction grating) which is disposed opposite the diffraction grating 13 (the fifth diffraction grating) between the diffraction grating 13 (the fifth diffraction grating) and the half-wave plate 19. The light flux diameter expanding element 10 includes the diffraction grating 17 (the seventh diffraction grating) which is disposed opposite the diffraction grating 16 (the fourth diffraction grating) on the opposite side from the diffraction grating 15 (the third diffraction grating), and the diffraction grating 18 (the eighth diffraction grating) which is disposed opposite the diffraction grating 17 (the seventh diffraction grating) on the opposite side from the diffraction grating 16 (the fourth diffraction grating).

More specifically, as illustrated in FIGS. 8A to 8C, in the same manner as in the first embodiment, the light flux diameter expanding element 10 of the present embodiment includes the diffraction grating 11 and the diffraction grating 12. The diffraction grating 11 is provided with the grating pattern 111 which is formed of convex portions which extend linearly along the first direction X in the intra-surface direction of the first surface 451 intersecting the device optical axis La, and the diffraction grating 12 is provided with the grating pattern 121 which is formed of convex portions which extend linearly along the first direction X in the intra-surface direction of the second surface 452 facing the first surface 451. The light flux diameter expanding element 10 is provided with the diffraction grating 13 and the diffraction grating 14. The diffraction grating 13 is provided with the grating pattern 131 which is formed of convex portions which extend linearly along the first direction X in the intra-surface direction of the third surface 453 facing the second surface 452 on the opposite side from the first surface 451, and the diffraction grating 14 is provided with the grating pattern 141 which is formed of convex portions which extend linearly along the first direction X in the intra-surface direction of the fourth surface 454 facing the third surface 453 on the opposite side from the second surface 452. The grating patterns 111, 121, 131 and 141 are arranged periodically in a direction parallel to the second direction Y in the diffraction gratings 11, 12, 13, and 14, respectively. In the light flux diameter expanding element 10, the diffraction grating 11 and the diffraction grating 12 are disposed opposite each other, the diffraction grating 13 is disposed opposite the diffraction grating 12 between the diffraction grating 12 and the half-wave plate 19, and the diffraction grating 14 is disposed opposite the diffraction grating 13 between the diffraction grating 13 and the half-wave plate 19. Here, the grating period P1 is the same in the grating patterns 111, 121, 131, and 141.

The light flux diameter expanding element 10 of the present embodiment includes the diffraction grating 15 and the diffraction grating 16. The diffraction grating 15 is provided with a grating pattern 151 which is formed of convex portions which extend linearly along the second direction Y in the intra-surface direction of the fifth surface 455 intersecting the device optical axis La, and the diffraction grating 16 is provided with the grating pattern 161 which is formed of convex portions which extend linearly along the second direction Y in the intra-surface direction of the sixth surface 456 facing the fifth surface 455 on the emission side of the diffraction grating 15. The light flux diameter expanding element 10 is provided with the diffraction grating 17 and the diffraction grating 18. The diffraction grating 17 is provided with the grating pattern 171 which is formed of convex portions which extend linearly along the second direction Y in the intra-surface direction of the seventh surface 457 facing the sixth surface 456 on the opposite side from the fifth surface 455, and the diffraction grating 18 is provided with the grating pattern 181 which is formed of convex portions which extend linearly along the second direction Y in the intra-surface direction of the eighth surface 458 facing the seventh surface 457 on the opposite side from the sixth surface 456. The grating patterns 151, 161, 171 and 181 are arranged periodically in a direction parallel to the first direction X in the diffraction gratings 15, 16, 17, and 18, respectively. In the light flux diameter expanding element 10, the diffraction grating 16 is disposed opposite the diffraction grating 15 on the opposite side from the half-wave plate 19, and the diffraction grating 18 is disposed opposite the diffraction grating 17 on the opposite side from the diffraction grating 16. Here, the grating period P2 is the same in the grating patterns 151, 161, 171, and 181. In the present embodiment, the grating periods P1 and P2 are the same.

In the present embodiment, in the diffraction gratings 11, 12, 13, and 14, transparent substrates are disposed between two adjacent diffraction gratings. More specifically, in the first surface 451, the second surface 452, the third surface 453, and the fourth surface 454, either one of the two surfaces which are adjacent in the device optical axis La is formed on one surface of a transparent substrate, and the other is formed on the other surface of the transparent substrate. In the diffraction gratings 15, 16, 17, and 18, transparent substrates are disposed between two adjacent diffraction gratings. More specifically, in the fifth surface 455, the sixth surface 456, the seventh surface 457, and the eighth surface 458, either one of the two surfaces which are adjacent in the optical axis direction is formed on one surface of a transparent substrate, and the other is formed on the other surface of the transparent substrate.

More specifically, the first surface 451 is the one surface 1a of the transparent substrate 1 (the first transparent substrate), and the second surface 452 is the other surface 1b of the transparent substrate 1. The third surface 453 is the one surface 2a of the transparent substrate 2 (the third transparent substrate), and the fourth surface 454 is the other surface 2b of the transparent substrate 2. The fifth surface 455 is a one surface 3a of a transparent substrate 3 (a second transparent substrate), and the sixth surface 456 is another surface 3b of the transparent substrate 3. The seventh surface 457 is a one surface 4a of a transparent substrate 4 (a fourth transparent substrate), and the eighth surface 458 is another surface 4b of the transparent substrate 4.

Here, the transparent substrates 1 and 2 are transparent substrates with the same thickness. Therefore, the interval between the first surface 451 and the second surface 452 is equal to the interval between the third surface 453 and the fourth surface 454. The transparent substrates 3 and 4 are transparent substrates with the same thickness. Therefore, the interval between the fifth surface 455 and the sixth surface 456 is equal to the interval between the seventh surface 457 and the eighth surface 458. Note that, each of the grating patterns 111, 121, 131, 141, 151, 161, 171, and 181 may be formed as concave portions which are formed on the transparent substrate 1, 2, 3, or 4 using etching or the like.

In the light flux diameter expanding element 10 which is configured in this manner, the red laser element 511(R), the green laser element 511(G), and the blue laser element 511(B) are used as light sources in the light source unit 51 which is described with reference to FIGS. 1A and 1B, and the light sources are polarized light sources which emit the light flux L0 (a polarized light flux) of polarized light in which the electric field vector oscillates in the first direction X when incident on the light flux diameter expanding element 10. Therefore, the light flux L0 which is incident on the light flux diameter expanding element 10 enters, as a TE wave, the diffraction gratings 11, 12, 13, and 14 which are provided with the grating patterns 111, 121, 131, and 141 which are formed of convex portions which extend linearly along the first direction X. Therefore, according to the diffraction gratings 11, 12, 13, and 14, it is possible to expand the diameter of the incident light flux L0 in the second direction Y and emit the result as the light flux L1 (refer to FIG. 3B).

The diffraction gratings 15, 16, 17, and 18 are provided with the grating patterns 151, 161, 171, and 181 which are formed of convex portions which extend linearly along the second direction Y, and the light flux L1 which is emitted from the diffraction grating 14 is converted by the half-wave plate 19 into polarized light (the light flux L2) in which the electric field vector oscillates in the second direction Y. Therefore, the light flux L2 which is incident on the diffraction grating 15 enters, as a TE wave, the diffraction gratings 15, 16, 17, and 18 which are provided with the grating patterns 151, 161, 171, and 181 which are formed of convex portions which extend linearly along the second direction Y. Therefore, according to the diffraction gratings 15, 16, 17, and 18, it is possible to expand the diameter of the incident light flux L2 in the first direction X and emit the result as the light flux L3.

Therefore, according to the light flux diameter expanding element 10 of the present embodiment, it is possible to expand the diameter of the incident light flux L0 in the first direction X and the second direction Y and emit the result as the light flux L3.

Note that, in the present embodiment, the transparent substrates 1 and 2 are transparent substrates with the same thickness; however, a configuration may be adopted in which, in the same manner as the third configuration example and the fourth configuration example described with reference to FIGS. 6 to 7B, the thickness of the transparent substrate 1 is rendered different from the thickness of the transparent substrate 2, and the interval between the first surface 451 and the second surface 452 is rendered different from the interval between the third surface 453 and the fourth surface 454. In the present embodiment, the transparent substrates 3 and 4 are transparent substrates with the same thickness; however, a configuration may be adopted in which, in the same manner as the third configuration example and the fourth configuration example described with reference to FIGS. 6 to 7B, the thickness of the transparent substrate 3 is rendered different from the thickness of the transparent substrate 4, and the interval between the fifth surface 455 and the sixth surface 456 is rendered different from the interval between the seventh surface 457 and the eighth surface 458. In this case, in the same manner as in the third configuration example and the fourth configuration example, in regard to both the first direction X and the second direction Y, it is possible to suitably set the emission positions of the diffracted light beams which are emitted finally in the first direction X and the second direction Y. Note that, in the present embodiment, eight diffraction gratings are used; however, as long as the number of diffraction gratings is an even number, an embodiment other than the ones described above may be adopted.

Other Embodiments

In the embodiments described above, a half mirror (the reflecting member 53) is used as the combiner of the light guide system 52; however, some embodiments may be applied to a display device which uses a holographic optical element as the combiner.

In the embodiments described above, in the light source unit 51 described with reference to FIGS. 1A and 1B, a polarized light source (the red laser element 511(R), the green laser element 511(G), and the blue laser element 511(B)) which emits the light flux L0 of polarized light in which the electric field vector oscillates in the first direction X when incident on the light flux diameter expanding element 10 is used. However, the light source unit 51 may be configured using a light source which emits light with random polarization containing polarized light in which the electric field vector oscillates in the first direction X and polarized light in which the electric field vector oscillates in the second direction Y, and an optical element such as a polarization conversion element or a polarizing plate which aligns the light which is emitted from the light source to light in which the electric field vector oscillates in the first direction X.

The entire disclosure of Japanese Patent Application No. 2015-059173, filed Mar. 23, 2015 is expressly incorporated by reference herein.

What is claimed is:

1. A display device comprising:
   a light source unit which emits a polarized light flux; and
   a light flux diameter expanding element onto which the polarized light flux is incident and which expands a light flux diameter of the polarized light flux and emits the light flux,
   wherein an electric field vector in the polarized light flux which enters the light flux diameter expanding element oscillates in a first direction,
   wherein the light flux diameter expanding element includes:
      a first diffraction grating that has a plurality of concave portions or convex portions each of which extends along the first direction and is arranged periodically in a second direction intersecting the first direction, and
      a second diffraction grating that has a plurality of concave portions or convex portions each of which extends along the first direction and is arranged periodically in the second direction, the second diffraction grating being disposed opposite the first diffraction grating, and
   wherein
      a grating period of the plurality of concave portions or the convex portions of the first diffraction grating is a same as a grating period of the plurality of concave portions or the convex portions of the second diffraction grating,
      the first diffraction grating is a transmission type diffraction grating, and
      the second diffraction grating is disposed so as to overlap the first diffraction grating.

2. The display device according to claim 1,
   wherein the light flux diameter expanding element further includes:
      a third diffraction grating that has a plurality of concave portions or convex portions each of which extends along the second direction and is arranged periodically in the first direction, the third diffraction grating being disposed opposite the second diffraction grating on an opposite side from the first diffraction grating,
      a fourth diffraction grating that has a plurality of concave portions or convex portions each of which extends along the second direction and is arranged periodically in the first direction, the fourth diffraction grating being disposed opposite the third diffraction grating on an opposite side from the second diffraction grating, and
      a half-wave plate which is disposed between the second diffraction grating and the third diffraction grating, and
   wherein
      a grating period of the plurality of concave portions or the convex portions of the third diffraction grating is a same as a grating period of the plurality of concave portions or the convex portions of the fourth diffraction grating,
      the third diffraction grating is a transmission type diffraction grating, and
      the fourth diffraction grating is disposed so as to overlap the third diffraction grating.

3. The display device according to claim 2,
   wherein a first transparent substrate is disposed between the first diffraction grating and the second diffraction grating, and
   wherein a second transparent substrate is disposed between the third diffraction grating and the fourth diffraction grating.

4. The display device according to claim 2,
   wherein the light flux diameter expanding element further includes:
      a fifth diffraction grating that has a plurality of concave portions or convex portions each of which extends along the first direction and is arranged periodically in the second direction, the fifth diffraction grating being disposed opposite the second diffraction grating between the second diffraction grating and the half-wave plate, and
      a sixth diffraction grating that has a plurality of concave portions or convex portions each of which extends along the first direction and is arranged periodically in the second direction, the sixth diffraction grating being disposed opposite the fifth diffraction grating between the fifth diffraction grating and the half-wave plate, and
   wherein a grating period of the plurality of concave portions or the convex portions of the fifth diffraction grating is the same as both the grating period of the plurality of concave portions or the convex portions of the first diffraction grating and a grating period of the plurality of concave portions or the convex portions of the sixth diffraction grating.

5. The display device according to claim 2,
   wherein the light flux diameter expanding element further includes:
      a seventh diffraction grating that has a plurality of concave portions or convex portions each of which extends along the second direction and is arranged periodically in the first direction, the seventh diffraction grating being disposed opposite the fourth diffraction grating on an opposite side from the third diffraction grating, and
      an eighth diffraction grating that has a plurality of concave portions or convex portions each of which extends along the second direction and is arranged periodically in the first direction, the eighth diffraction grating being disposed opposite the seventh diffraction grating on an opposite side from the fourth diffraction grating, and wherein a grating period of the plurality of concave portions or the convex portions of the seventh diffraction grating is the same as both the grating period of the plurality of concave portions or the convex portions of the third diffraction grating and a grating period of the plurality of concave portions or the convex portions of the eighth diffraction grating.

6. The display device according to claim 1, wherein the light source unit is provided with a polarized light source which emits the polarized light flux.

7. The display device according to claim 1, wherein the light source unit is provided with a light source which emits light with random polarization, and an optical element which aligns an oscillation direction of the electric field vector in the light which is emitted from the light source.

8. The display device according to claim 1, further comprising:

a scanning optical system which scans the polarized light flux which is emitted from the light source unit, the scanning optical system generates an image; and a light guide system which causes a light flux which is scanned by the scanning optical system, the light guide system enters the light flux to an eye of a user, wherein the light flux diameter expanding element is disposed in an optical path from the scanning optical system to the light guide system, or in an optical path of the light guide system.

9. A light flux diameter expanding element comprising:

a first diffraction grating including a plurality of concave portions or convex portions each of which extends along a first direction and is arranged periodically in a second direction intersecting the first direction;

a second diffraction grating including a plurality of concave portions or convex portions each of which extends along the first direction and is arranged periodically in the second direction, the second diffraction grating being disposed opposite the first diffraction grating;

a third diffraction grating including a plurality of concave portions or convex portions each of which extends along the second direction and is arranged periodically in the first direction, the third diffraction grating being disposed opposite the second diffraction grating on an opposite side from the first diffraction grating;

a fourth diffraction grating including a plurality of concave portions or convex portions each of which extends along the second direction and is arranged periodically in the first direction, the fourth diffraction grating being disposed opposite the third diffraction grating on an opposite side from the second diffraction grating; and a half-wave plate which is disposed between the second diffraction grating and the third diffraction grating, wherein a grating period of the plurality of concave portions or the convex portions of the first diffraction grating is a same as a grating period of the plurality of concave portions or the convex portions of the second diffraction grating, a grating period of the plurality of concave portions or the convex portions of the third diffraction grating is a same as a grating period of the plurality of concave portions or the convex portions of the fourth diffraction grating, the first diffraction grating is a transmission type diffraction grating, the second diffraction grating is disposed so as to overlap the first diffraction grating, the third diffraction grating is a transmission type diffraction grating, and the fourth diffraction grating is disposed so as to overlap the third diffraction grating.

10. The light flux diameter expanding element according to claim 9, wherein a first transparent substrate is disposed between the first diffraction grating and the second diffraction grating, and wherein a second transparent substrate is disposed between the third diffraction grating and the fourth diffraction grating.

11. The light flux diameter expanding element according to claim 9, further comprising:

a fifth diffraction grating including a plurality of concave portions or convex portions each of which extends along the first direction and is arranged periodically in the second direction, the fifth diffraction grating being disposed opposite the second diffraction grating between the second diffraction grating and the half-wave plate; and a sixth diffraction grating including a plurality of concave portions or convex portions each of which extends along the first direction and is arranged periodically in the second direction, the sixth diffraction grating being disposed opposite the fifth diffraction grating between the fifth diffraction grating and the half-wave plate, wherein a grating period of the plurality of concave portions or the convex portions of the fifth diffraction grating is the same as both the grating period of the plurality of concave portions or the convex portions of the first diffraction grating and a grating period of the plurality of concave portions or the convex portions of the sixth diffraction grating.

12. The light flux diameter expanding element according to claim 9, further comprising:

a seventh diffraction grating including a plurality of concave portions or convex portions each of which extends along the second direction and is arranged periodically in the first direction, the seventh diffraction grating being disposed opposite the fourth diffraction grating on an opposite side from the third diffraction grating; and an eighth diffraction grating including a plurality of concave portions or convex portions each of which extends along the second direction and is arranged periodically in the first direction, the eighth diffraction grating being disposed opposite the seventh diffraction grating on an opposite side from the fourth diffraction grating, wherein a grating period of the plurality of concave portions or the convex portions of the seventh diffraction grating is the same as both the grating period of the plurality of concave portions or the convex portions of the third diffraction grating and a grating period of the plurality of concave portions or the convex portions of the eighth diffraction grating.

* * * * *